United States Patent [19]
Neuhaus et al.

[11] Patent Number: 5,903,565
[45] Date of Patent: May 11, 1999

[54] SERIAL BUS SYSTEM USING BITWISE ARBITRATION FOR INDEPENDENTLY COMMUNICATING WITH AND CONTROLLING INDIVIDUAL BUS SYSTEMS

[75] Inventors: Detlev Neuhaus; Wolfgang Stehr; Jochen Kalter; Frank Pietsch, all of Hannover, Germany

[73] Assignee: WABCO GmbH, Germany

[21] Appl. No.: 08/515,150

[22] Filed: Aug. 15, 1995

[30] Foreign Application Priority Data

Aug. 24, 1994 [DE] Germany .............................. 44 29 953

[51] Int. Cl.⁶ ...................................................... H04J 3/02
[52] U.S. Cl. ........................... 370/402; 370/407; 370/447
[58] Field of Search ..................................... 370/386, 388, 370/401, 402, 462, 466, 475, 451, 447, 446, 407

[56] References Cited

U.S. PATENT DOCUMENTS

| | | | |
|---|---|---|---|
| 4,417,334 | 11/1983 | Ganderson et al. | 370/402 |
| 4,715,031 | 12/1987 | Crawford et al. | 370/475 |
| 4,845,722 | 7/1989 | Kent et al. | 370/388 |

FOREIGN PATENT DOCUMENTS

| | | | |
|---|---|---|---|
| 42 24 339 A1 | 1/1994 | Germany | H04L 12/44 |

OTHER PUBLICATIONS

"87C196CA Advanced 16–Bit CHMOS Microcontroller With Integrated Can 2.0", Intel Prod. Review (1993).

"Information Processing Systems—Open Systems Interconnection—Basic Reference Model", International Organization for Standardization, ISO 7498 (1984).

"Information Processing Systems—Local Area Networks—Part 3: Carrier Sense Multiple Access With Collision Detection (CSMA/CD) Access Method and Physical Layer Specifications", International Organization for Standardization, ISO 8802–3 (1989), ANSI/IEEE Std 802.3 (1988).

"Road Vehicles—Interchange of Digital Information—Controller Area Network (CAN) for High–Speed Communication", International Organization for Standardization, Draft Int. Std. ISO DIS 11898 (1992).

"Road Vehicles—Interchange of Digital Information—Controller Area Network (CAN) for High–Speed Communication", International Organization for Standardization, Draft Int. Std. ISO 11898 (1993).

Road Vehicles—Low Speed Serial Data Communication—Part 2: Vehicle Area Network (VAN), International Organization for Standardization, Int. Std. ISO DIS 11519–2 (1991).

"Automotive Serial Controller Area Network" Uwe Klencke, Siegfried Dals, Martin Litschel, Society of Automotive Engineers, Inc. (1986).

"A High Performance Solution for In–Vehicle Network—'Controller Area Network (CAN)'", David J. Arnett, Society of Automotive Engineers, Inc. (1987).

*Primary Examiner*—Dang Ton
*Assistant Examiner*—Shick Hom
*Attorney, Agent, or Firm*—Proskauer Rose LLP

[57] ABSTRACT

A star coupler for serial bus systems operates in compliance with the carrier sense multiple access (CSMA) method. The star coupler connects a plurality of individual bus systems to corresponding T-drivers and associated logic circuits, so that arbitration is performed within the total bus system in which all individual bus systems are included. Feedback suppression is used to assure unidirectional data flow, while error detection is combined with switching logic to disable faulty individual bus systems without affecting the other connected individual bus systems.

15 Claims, 7 Drawing Sheets

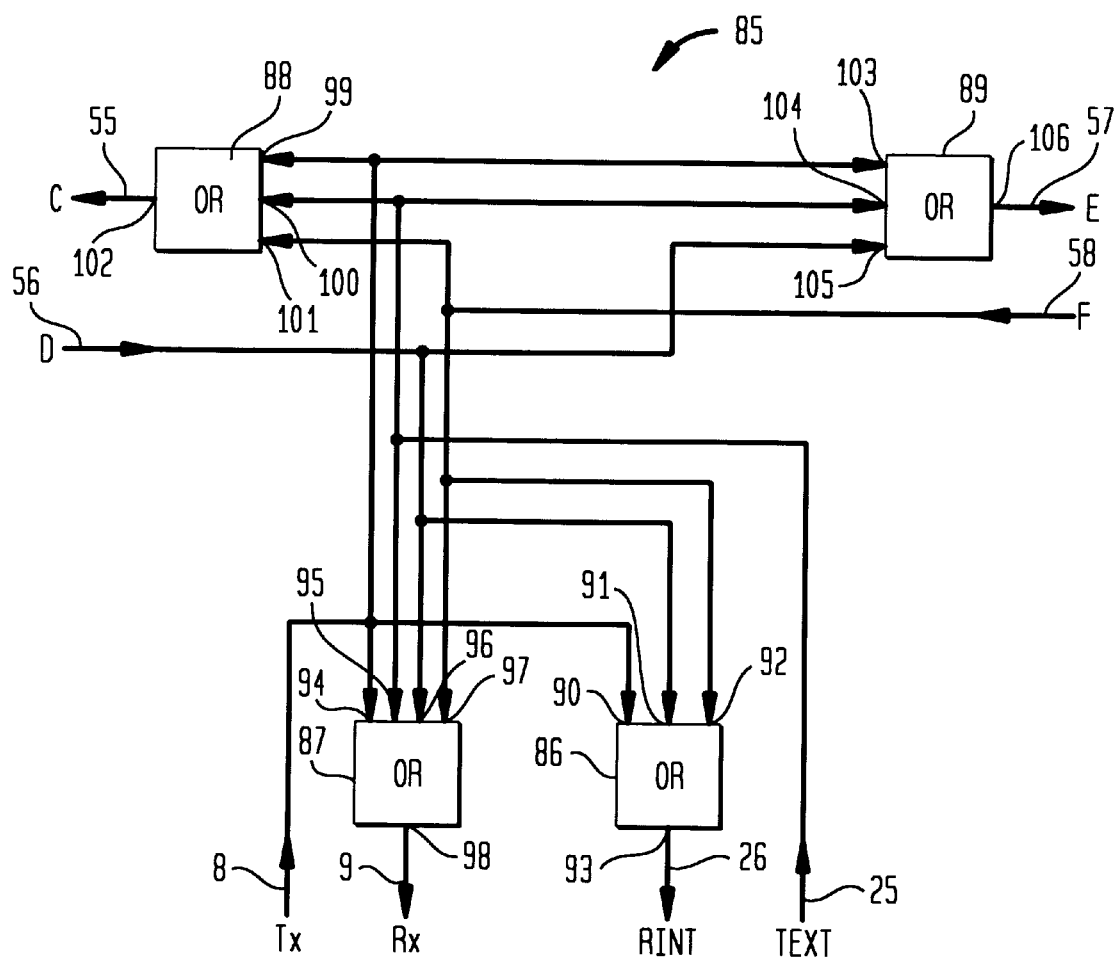

ial bus system which avoids the aforementioned disadvantages of the prior art.

SERIAL BUS SYSTEM USING BITWISE ARBITRATION FOR INDEPENDENTLY COMMUNICATING WITH AND CONTROLLING INDIVIDUAL BUS SYSTEMS

FIELD OF THE INVENTION

The invention relates to a serial bus system operating in a carrier sense multiple access method with bitwise arbitration.

BACKGROUND OF THE INVENTION

Serial bus systems are known from the Controller Area Network Standard Draft ISO/DIS 11 898 (identified herein as "CAN standard") or by the Standard ISO 11519 Vehicle Area Network (VAN) and CAN low speed serial data communication).

One disadvantage of these available bus systems is that a permanent fault, for example a short circuit, leads to the total loss of the entire bus system. The more parties connected to a bus, the more parties are affected by a total loss. A further disadvantage is that each connected party also represents an interference point of irregularity, which causes reflections. The transmission security of the bus is degraded by these reflections. The more parties connected to the bus, the greater the degradation. As a result, the transmission reliability of the bus is determined, among other factors, by the number of parties.

It is therefore an object of the present invention to provide a serial bus system which avoids the aforementioned disadvantages of the prior art.

SUMMARY OF THE INVENTION

The present invention provides a serial bus system which uses the carrier sense multiple access method with bitwise arbitration in accordance with the CAN standard.

A plurality of individual bus systems are connected to T-drivers and logic circuits in a star coupler configuration, such that arbitration can take place between all connected individual bus systems.

Furthermore, feedback suppression is used to assure that data flows in only one direction at a time.

In addition, error detection is used in conjunction with switching logic to allow for switching off an individual bus system without affecting the data traffic between the other connected individual bus systems.

The invention will be explained in detail below by means of an exemplary embodiment represented in the drawings and making use of the CAN protocol.

BRIEF DESCRIPTION OF THE DRAWINGS

FIG. 3 represents the logic unit in a T-driver.

FIGS. 4b to d show the logic states in the feedback suppression device of FIG. 4a.

DETAILED DESCRIPTION OF THE INVENTION

For the purpose of clarity, the description of the invention uses the terminology of the CAN Standard Draft ISO/DIS 11898.

The circuit parts described below are primarily constructed of electronic logic circuit elements, such as AND-elements, OR-elements or inverters. Voltage levels which correspond to a logic-0 or logic-1 state are applied to the inputs of such circuit elements. A positive logic is the basis of the exemplary embodiment of the invention described herein, wherein a low voltage level (approximately zero volts) is associated with a logic 0, and a high voltage level (approximately equal to the electrical supply voltage) with a logic 1. The description of the invention explains how the logic circuit elements are linked with each other, and which logic states are present at their inputs. With the determination of the logic states at the inputs of a logic circuit element, and the determination of the function of the circuit element, the logic state at the output of this circuit element results from its function and the known laws of Boolean algebra.

For example, if the logic circuit element consists of an AND-element, the output of the AND-element shows a logic 1 state if and only if all its inputs have been placed into a logic 1 state. If any one of the inputs is in a logic 0 state, the output of the AND-element is set to logic 0.

However, the invention is not limited to the use of logic circuit elements with voltage levels in positive logic. It is alternatively possible, for example, to employ logic circuit elements with current levels. Also, in place of positive logic, it is also possible to employ negative logic. The levels used depend on the selected technology.

In the same way, the invention is not limited to the below-described technology of bus drivers and bus receivers according to the CAN standard. With different technologies, other physical levels which represent the transmission medium on the bus may result.

Figure 1:
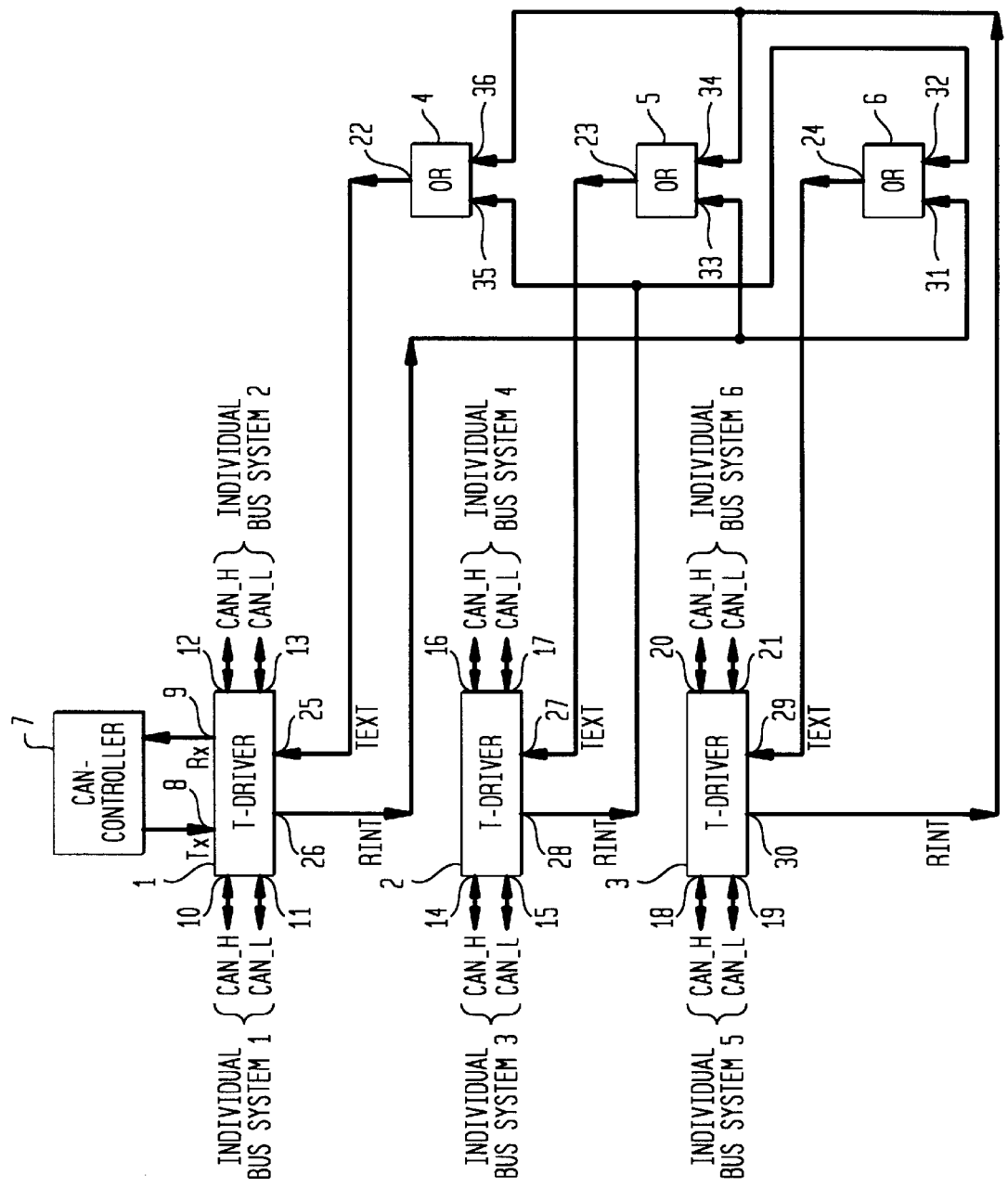
FIG. 1 is a block diagram of a star coupler for six individual bus systems in accordance with the CAN standard, using three T-drivers.

Three T-drivers (1, 2, 3) are shown in FIG. 1, wherein the T-driver (1) is connected to the individual bus systems 1 and 2, the T-driver (2) to the individual bus systems 3 and 4, and the T-driver (3) to the individual bus systems 5 and 6. The T-driver (1) is connected to the individual bus system 1 via a first input/output (10) (signal "CAN_H") and via a second input/output (11) (signal "CAN_L"), and with the second individual bus system 2 via a third input/output (12) (signal "CAN_H") and a fourth input/output (13) (signal "CAN_L"). In the same way the T- driver (2) is connected to the individual bus system 3 via a first and second input/output (14, 15) and to the individual bus system 4 via a third and fourth input/output (16, 17), and the T- driver (3) is connected to the individual bus system 5 via a first and second input/output (18, 19) and to the individual bus system 6 via a third and fourth input/output (20, 21).

Each individual bus system represents a bus system in accordance with the CAN standard. A bus line, consisting of two conductors on which the levels of the signals "CAN_H" and "CAN_L" are transmitted, is provided for each individual bus system.

Three logic OR-elements (4, 5, 6) are provided for connecting T-drivers (1, 2, 3). The output (22) of OR-element (4) is connected to a fifth input (25) (signal "Text" of T-driver (1)) the output (23) of OR-element (5) is connected to a fifth input (27) of T-driver (2) and the output (24) of OR-element (6) is connected to a fifth input (29) of T-driver (3). A first input (31) of OR-element (6) is connected to a sixth output (26) of T-driver (1) (signal "Rint") and a second input (32) of OR-element (6) is connected to a sixth output (28) of T-driver (2). In the same way, the first and second inputs (33, 34) of OR-element (5) are connected to the sixth output (26) of T-driver (1) and a sixth output (30) of T-driver (3) respectively, while the first and second inputs (35, 36) of OR-element (4) are connected to the sixth output (28) of T-driver (2) and the sixth output (30) of T-driver (3) respectively.

In addition, T-driver (1) is connected to a CAN controller (7) via a seventh input (8) (signal "Tx") and an eighth output (9) (signal "Rx").

The CAN controller (7) represents a conventional bus control unit in accordance with the CAN standard. In typical applications, a CAN controller controls the data traffic on the bus with the aid of at least two control signals (8, 9), which are usually designated "Rx" and "Tx". In accordance with the objects of the invention, the CAN controller (7), which can be a commercially available CAN controller (for example Intel type 87CI96CA "Advanced 16-bit CHMOS microcontroller with integrated CAN 2.0"), controls a plurality of individual bus systems. In the exemplary embodiment in accordance with FIG. 1, three T-drivers are provided with two individual bus systems each, so that in this exemplary embodiment, six individual bus systems are controlled by CAN controller (7). CAN controller (7) is connected to one T-driver, that is, T-driver (1) in FIG. 1, as explained above, whose seventh and eighth inputs (8, 9) are connected to CAN controller (7).

Except for this special role of the T-driver (1), all T-drivers (1, 2, 3) are functionally equal. A serial bus system is created by connecting T-drivers (1, 2, 3) to each other by means of OR-elements (4, 5, 6). This bus system operates in accordance with the carrier sense multiple access method (CMSA) with bitwise arbitration as in the CAN standard. This consists of six individual bus systems connected to a star coupler, which in this case consists of the three T-drivers (1, 2, 3). As will be explained below, an arbitration in which all connected individual bus systems are included takes place within the entire bus system. The measures required for this will also be described below.

Under certain conditions, each one of the T-drivers (1, 2, 3) included in the star coupler generates a logic 1 signal (signal "Rint") at its sixth output (26, 28, 30 respectively). Each one of the T-drivers (1, 2, 3) can also receive an input signal (signal "Text") at their fifth inputs (25, 27, 29). OR-elements (4, 5, 6) transmit the signal "Text"=logic 1 to all T-drivers (1, 2, 3) when the signal "Rint" from at least one T-driver (1, 2, or 3) is set to logic 1.

The configuration of three T-drivers (1, 2, 3) and three OR-elements (4, 5, 6) of FIG. 1 can be arbitrarily expanded into a structure of a star coupler with n (i. e. an arbitrary number) T-drivers, if n T-drivers are provided, and n OR-elements, each having (n−1) inputs, are used for connecting the T-drivers with each other. The connection of the n T-drivers with the n OR-elements then takes place in an analogous manner to the example of a star coupler with three T- drivers and three OR-elements as shown in FIG. 1.

Figure 2:
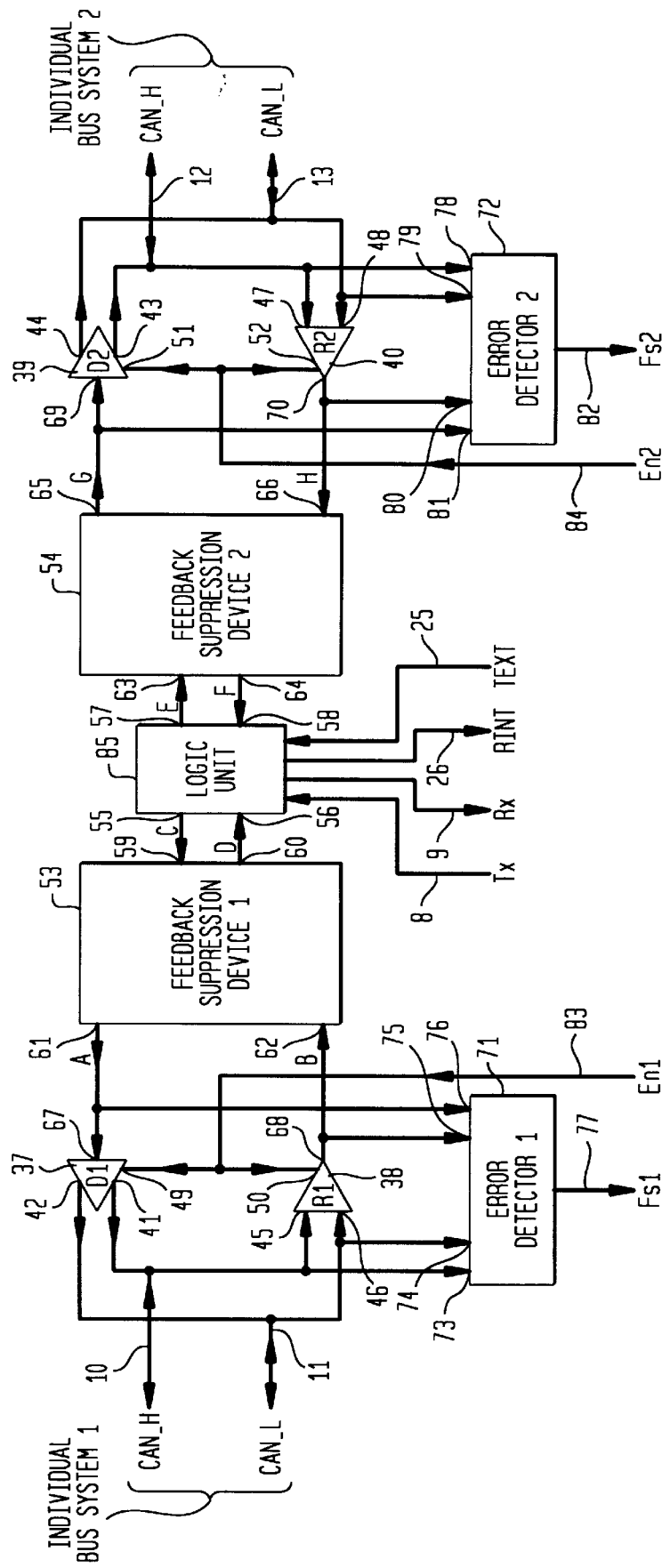
FIG. 2 is a block diagram of a T-driver.

FIG. 2 shows T-driver (1) of FIG. 1 with its connections.

The first and second inputs/outputs (10, 11) are connected to the individual bus system 1 and the third and fourth inputs/outputs (12, 13) to the individual bus system 2. As already explained, a fifth input (25) and a sixth output (26) are connected to OR-elements 4, 5 and 6 shown in FIG. 1. As also already explained, the seventh input (8) and the eighth output (9) lead to CAN controller (7), as illustrated in FIG. 1.

A bus driver acting as a transmitting unit and a bus receiver acting as a receiving unit are provided for each one of the individual bus systems connected to a T-driver. For the individual bus system 1, these are the bus driver (37) and the bus receiver (38); for the individual bus system 2, they are the bus driver (39) and the bus receiver (40). Each bus driver has a first and second output. The output (41) represents the first output, and the output (42) the second output, for bus driver (37). In the same way, the outputs (43, 44) represent the first and second outputs of bus driver (39).

Each bus receiver has a first and a second input. For bus receiver (38), they are the first input (45) and the second input (46), and for bus receiver (40), the inputs (47) and (48).

In accordance with their association, the first and second outputs of a bus driver are connected to the respective individual bus system with the first and second inputs/outputs of the associated T-driver and the first and second inputs of the associated bus receiver. Thus, the first output (41) of bus driver (37) is connected to the first input/output (10) of the T-driver for the individual bus system 1 and the first input (45) of the bus receiver (38). The second output (42) of bus driver (37) is connected with the second input/output (11) of the T-driver for the individual bus system 1 and the second input (46) of bus receiver (38).

In the same way, the first and second outputs (43, 44) of bus driver (39) are connected with the third and fourth inputs/outputs (12, 13 respectively) of the T-driver for the individual bus system 2 and the first and second inputs (47 and 48 respectively) of bus receiver (40).

Each bus driver and each bus receiver has a control input. These are the control input (49) for bus driver (37), the control input (51) for bus driver (39), the control input (50) for bus receiver (38), and the control input (52) for bus receiver (40).

The control input (49) is connected to the control input (50), wherein this combined signal becomes the common control signal (83) (signal "En1") for bus driver (37) and bus receiver (38), both of which are associated with the individual bus system 1. By using the control signal (83), it is therefore possible to commonly control the bus driver and the bus receiver functions of the individual bus system 1. Only one control signal (83) is required for the common control of these functions.

In the same way, the control signals (51, 52) are combined into a common control signal (84), which is used for the common control of the units associated with the individual bus system 2, namely, bus driver (39) and bus receiver (40).

The individual bus systems 1 or 2 can be switched on or off with the aid of the control signals (83, 84). A logic 1 level at the input (83, 84) of the control signals switches the respective individual bus system on ("Enable" function at the bus driver as well as at the bus receiver). A logic 0 level switches the respective individual bus system off ("Disable" function at the bus driver as well as at the bus receiver).

Switching an individual bus system on or off with control signals (83, 84) does not affect the other individual bus systems of the star coupler. This means that the data traffic, inclusive of the arbitration process, is not degraded in these other individual bus systems when an individual bus system is switched on or off. Thus, it is possible at any desired time to switch an individual bus system on or off without danger of disrupting the data traffic of the other individual bus systems of the star coupler.

A device (71, 72) for detecting sustained errors in an individual bus system will be further described below.

Advantageously, when a bus system is error free, the error detection device (71, 72) enables the connection of this individual bus system to the other bus systems via the control signal (83, 84). In the opposite case, if a sustained error is detected in an individual bus system, the respective individual bus system is switched out by the control signal (83, 84).

In addition to the signals described above, all bus drivers have an input and all bus receivers have an output. The input for bus driver (37) consists of the input (67) (signal "A"), the input for bus driver (39) consists of the input (69) (signal "G"), the output from bus receiver (38) is the output (68) (signal "B"), and the output from bus receiver (40) is the output (70) (signal "H")

A device for detecting errors is provided for each individual bus system. For the individual bus system 1, it is the error detector 1 (71), and for the individual bus system 2, the error detector 2 (72). An error detection device has first devices for measuring the voltage levels on the bus lines of the individual bus system associated with it. It also has second devices for measuring the logic level at the input of the corresponding bus driver, and third devices for measuring the logic level at the output of the corresponding bus receiver. It therefore has altogether four inputs and one error output. The error detector 1 (71) has the following connections:

first input (73) to the first input/output (10) of T- driver (1), second input (74) to the second input/output (11) of T-driver (1), third input (75) to the output (68) of bus receiver (38), fourth input (76) to the input (67) of bus driver (37).

The inputs (78, 79, 80, 81) of the error detector 2 (72) are connected in the same way with the lines (12, 13, 70, and 69 respectively). The error output (77) (signal "Fs1") of error detector 1 (71) leads to a processing unit, not shown, in connection with errors in the individual bus system 1, and the error output (82) (signal "Fs2") of error detector 2 (72) leads to a processing unit, also not shown, in connection with errors in the individual bus system 2. Since error detector 1 (71) and error detector 2 (72) are designed to be completely symmetrical, they operate in the same way. Their functions will be explained by means of error detector 1 (71) of FIG. 2.

Error detector 1 (71) reads in the voltage levels on its four inputs (73, 74, 7_5, 76) and by means of comparisons, determines whether recognizable errors are present in its associated individual bus system 1.

By means of the voltage levels at its first and second inputs (73, 74), error detector 1 (71) determines whether the voltage levels (10, 11) in the individual bus system 1 lie within the permissible tolerance range. If the levels (10, 11) are outside of the tolerance level permissible in accordance with the CAN standard, a sustained error is present.

Error detector 1 (71) also checks the status of the bus lines of the individual bus system 1 and compares it with the input (67) of bus driver (37) and the output (68) of bus receiver (38).

If the level of the input (67) of bus driver (37) equals a logic 1, the voltage levels at the first and second inputs (73, 74) of error detector 1 (71) must correspond to the status "dominant". However, if the status is "recessive", there is most likely an error in the individual bus system 1. The latter case indicates that the data which were expected, on the basis of the logic 1 status, at the input (67) of bus driver (37), are not present as expected.

In all error states mentioned, error detector 1 (71) places the output (77) at logic level 1. When there is no detected error, the output (77) is placed at logic level 0.

A feedback suppression device is provided for each individual bus system. These are the feedback suppression device 1 (53) for the individual bus system 1, and the feedback suppression device 2 (54) for the individual bus system 2.

A logic unit (85) is provided for the logical linking of the individual bus systems 1 and the individual bus system 2. The following signals of T-driver (1) have already been explained in the course of the explanations regarding FIG. 1: the fifth input (25), the sixth output (26), the seventh input (8) and the eighth output (9). The signals represent input signals or output signals of the logic unit (85), which is a partial circuit of T-driver (1). In detail, the fifth and seventh inputs (25, 8) of T-driver (1) of FIG. 1 constitute the first and second inputs respectively, of logic unit (85) of FIG. 2, and the sixth and eighth outputs (26, 9) of the T- driver of FIG. 1 constitute the first and second outputs respectively of logic unit (85) of FIG. 2.

Logic unit (85) also has a third output (55) (signal "C"), a third input (56) (signal "D"), a fourth output (57) (signal "E") and a fourth input (58) (signal "F").

Feedback suppression device 1 (53) is inserted between logic unit (85) and the arrangement of bus driver (37) and bus receiver (38) for individual bus system 1. In the same way, feedback suppression device 2 (54) is inserted between logic unit (85) and the bus driver and bus receiver (39, 40) associated with the individual bus system 2. Therefore, there is complete symmetry between the partial circuits (53, 37, 38) associated with the individual bus system 1, and the partial circuits (54, 39, 40) associated with the individual bus system 2. The internal structure of corresponding partial circuits is identical.

Both feedback suppression devices (53, 54) have two inputs and two outputs, respectively. Feedback suppression device 1 (53) is connected to logic unit (85) and to bus driver (37) and bus receiver (38) (associated with the individual bus system 1) via the following connections: the first input (59) to the third output (55) of logic unit (85) (signal "C"); the first output (60) to the input (56) of logic unit (85) (signal "D"); the second output (61) to the input (67) of bus driver (37) (signal "A"); and the second input (62) to the output (68) of bus receiver (38) (signal "B"). The inputs and outputs of the feedback suppression device 2 (54), (63, 64, 65, 66) are connected in the same manner to the inputs and outputs (57, 58, 69, and 70 respectively).

FIG. 3 shows logic unit (85) for T-driver (1) with the following signals, as previously identified in conjunction with the description of T-driver (1):

First input (25) [=fifth input of T-driver (1) (signal "Text")], second input (8) [=seventh input of T-driver (1) (signal "Tx")], third input (56), (signal "D"), fourth input (58), (signal "F"), first output (26) [=sixth output of T-driver (1), (signal "Rint")], second output (9) [=eighth output of T-driver (1), (signal "Rx")], third output (55), (signal "C"), fourth output (57), (signal "E").

Logic unit (85) is constructed of four OR-elements connected with each other, wherein three OR-elements have three inputs, and one OR-element has four inputs.

First OR-element (86) has a first input (90), a second input (91), a third input (92) and an output (93), which represents the first output (26) (signal "Rint") of the logic unit (85). Second OR-element (87) has a first input (94), a second input (95), a third input (96), a fourth input (97) and an output (98), which represents the second output (9) (signal "Rx") of logic unit (85). Third OR-element (88) has a first input (99), a second input (100), a third input (101) and an output (102), which represents the third output (55) (signal "C") of logic unit (85). Fourth OR-element (89) has a first input (103), a second input (104), a third input (105) and an output (106), which represents the fourth output (57) (signal "E") of logic unit (85).

The first inputs (94, 99, 103) of the second, third and fourth OR-elements (87, 88, and 89 respectively) are connected to each other and represent the second input (8) (signal "Tx") of logic unit (85). The second inputs (95, 100, 104) of the second, third and fourth OR-elements (87, 88, and 89 respectively) are connected to each other and represent the first input (25) (signal "Text") of logic unit (85). The third input (56) (signal "D") of logic unit (85) is connected to the second input (91) of first OR-element (86) and the third inputs (96, 105) of the second and fourth OR-element (87 and 89 respectively). The fourth input (58) (signal "F") of logic unit (85) is connected to the fourth input (97) of second OR- element (87) and the third inputs (92, 101) of first and third OR-elements (86 and 88 respectively).

The following explanations initially assume that feedback suppression device 1 (53) and feedback suppression device 2 (54), as shown in FIG. 2, each consist of two continuous connections. In the feedback suppression device 1 (53), there is a continuous connection between the first input (59) and the second output (61), and a continuous connection between the second input (62) and the first output (60). In feedback suppression device 2 (54), the corresponding inputs and outputs (63, 65) and (66, 64) are continuously connected. Therefore, the third output (55) of logic unit (85) directly triggers the input (67) of bus driver (37) of the individual bus system 1 through this continuous connection. This means that a logic 1 level at the output (55) of logic unit (85) results in the formation of CAN standard voltage levels at the first and second outputs (41, 42) of bus driver (37) which correspond to the status "dominant". Bus receiver (38) converts these "dominant" levels at its first and second inputs (45, 46) to a logic 1 level at its output (68). This logic 1 level is then transmitted via the above mentioned continuous connection through feedback suppression device 1 (53) to the third input (56) of logic unit (85).

On the other hand, if the levels at inputs (45, 46) of bus receiver (38) correspond to the status "recessive", a logic 0 level appears at the output (68) of bus receiver (38), and is then transmitted to the third input (56) of logic unit (85).

Because of the symmetrical structure, a logic 1 level at the fourth output (57) of logic unit (85) generates the status "dominant" in the same manner in the individual bus system 2. Analogously to what has been stated before, a logic 1 level appears at the fourth input (58) of logic unit (85) when the status "dominant" is present.

To sum up, it can be stated that the third output (55) (signal "C") of logic unit (85) controls the status of the individual bus system 1, and the fourth output (57) (signal "E") of logic unit (85) controls the status in the individual bus system 2. The status of individual bus system 1 appears at the third input (56) (signal "D") of logic unit (85), and the status of individual bus system 2 appears at the fourth input (58) (signal "F") of logic unit (85), in the form of a logic 1 or a logic 0 level.

To more completely describe the aforementioned process, a brief review of the control and receiver signals of a CAN standard bus is given below.

In CAN standard applications, the communication between the CAN controller and the connected bus takes place by means of two signals: namely, a signal "transmit" [this corresponds to the signal "Tx", i.e. the signal at the input (8) in FIG. 1], and a signal "receive" [this corresponds to the signal "Rx", i.e. the signal at the output (9) of FIG. 1]. The signal "transmit" is forwarded by the CAN controller to the bus driver. If the status of the signal "transmit" is at logic 1, the status "dominant" is generated on the connected bus. The bus receiver provides the signal "receive" which, in the case of the "dominant" bus status, has the status logic 1 and in the case of the "recessive" bus status the status logic 0.

In accordance with an embodiment of the present invention, the signal "Tx" also generates the bus status "dominant", and the signal "Rx" also provides information regarding the bus status; i.e., "dominant" or "recessive". In contrast to the prior art in accordance with the standard, the inventive signal "Tx" not only generates the "dominant" bus status on one bus, but in all individual bus systems of which the star coupler is comprised. As a logical result, the signal "Rx" in accordance with an embodiment of the present invention, represents the resultant sum of all bus states of all individual bus systems connected to the star coupler. A logical OR-function between all connected individual bus systems takes place on the basis of the bus driver and bus receiver circuits used with the CAN system; i. e., the signal "Rx" is at logic 1 if the "dominant" status is present on at least one of the connected individual bus systems, and it is at logic 0 if, and only if, all connected individual bus systems show the "recessive" status.

Together with the OR-elements (4, 5, 6) of FIG. 1, the logic unit (85) of FIG. 3 causes all individual bus systems connected in accordance with FIG. 1 to the star coupler to be placed in the "dominant" status, when the CAN controller (7) sets the signal at the seventh input (8) (signal "Tx") of the T-driver (1) of FIG. 1 to logic 1. The signal at the eighth output (9) (signal "Rx") of the T-driver (1) of FIG. 1 is always set to logic 1 when the "dominant" status is present on at least one of the individual bus systems connected to the star coupler. It is at logic 0, however, when all connected individual bus systems have the "recessive" status.

Logic unit (85) for the T-driver (1) of FIG. 2 has the task to assure, in cooperation with the identically designed logic units of T-driver (2) and T-driver (3) and OR-elements (4, 5, 6) of FIG. 1, that the "dominant" status is generated in all individual bus systems connected to the star coupler when a logic 1 level provided by the CAN controller (7) is present at the input (8) (signal "Tx"). Logic unit (85) has the additional task, in cooperation with the other logic units, to provide a logic 1 level at the output (9) (signal "Rx") of T-driver (1) of FIG. 1 to the CAN controller (7), if the "dominant" status is present on at least one of the individual bus systems connected to the star coupler (see FIG. 1). However, if the "recessive" status is present on all connected individual bus systems, a logic 0 level is present at the output (9) to the CAN controller (7) (signal "Rx").

The circuitry of OR-elements (86, 87, 88, 89) of logic unit (85), in relation to their inputs (25, 9, 56, 58) and outputs (26, 8, 55, 57), has already been explained above in conjunction with FIG. 3.

If, in accordance with FIG. 1, the CAN controller (7) sets the signal "Tx" to logic 1 [second input (8) of logic unit (85) in FIG. 3], the signal "C" [third output (55) of logic unit (85) in FIG. 3] as well as the signal "E" [fourth output (57) of logic unit (85) in FIG. 3] are set to logic 1 because of the OR-element circuitry. In accordance with the previous discussion regarding FIG. 2, the individual bus system 1, as well as the individual bus system 2, convert to the "dominant" status. Simultaneously, the signal "Rint" [first output (26) of logic unit (85) in FIG. 3] is set to logic 1. In cooperation with OR-elements (4, 5, 6) of FIG. 1, the signal "Rint" causes a logic 1 level to appear at the input for the signal "Text" [the fifth inputs (25, 27, 29) of T- drivers (1, 2, and 3 respectively) of FIG. 1] of all T-drivers (1, 2, 3) contained in the star coupler. By means of the signal "Text", all T-drivers which so far had not been participating (i.e. T-drivers with still "recessive" individual bus systems) are requested to set the individual bus systems connected to them to the "dominant" status. These are the two T-drivers (2, 3) in the example just discussed, wherein the first activation starts with the signal "Tx" from the CAN controller (7).

In contrast to the T-driver (1), the T-drivers (2, 3) do not need to have a seventh output (signal "Rx") and an eighth input (signal "Tx"). However, aside from these differences the T-drivers (2, 3) also contain a logic unit, as already mentioned, which is identical to logic unit (85) for T-driver (1), as shown in FIG. 3.

To realize the differences between T-driver (1) and T-drivers (2, 3) of FIG. 1, the logic units contained in T-drivers (2, 3) are wired differently, for which two measures are provided. The first measure consists of providing a bridge between the second input (8) of logic unit (85) [(signal "Tx") in FIG. 3] and ground of the device. In this way, there is a constant logic 0 level at the second inputs (8) of the logic units for the T-drivers (2, 3), thereby preventing any activation by this input. The second measure consists of not connecting the second output (9) [(signal "Rx") in FIG. 3] of the logic units for the T-drivers (2, 3). As a result, the outputs (98) (signal "Rx") of the second OR-element (87) of logic unit (85) of T-drivers (2, 3) in FIG. 3 are not evaluated.

Thus, in the above described example of the first activation of the star coupler via the signal "Tx" of the CAN controller (7) of FIG. 1, the further activations of T-drivers (2, 3) are triggered by the signals "Text" [fifth inputs (27, 29) in FIG. 1], following the first activation of the T-driver (1).

The effect of the signal "Text" will be further explained by means of the example of T-driver (2). Because of the similarity of the circuit structure of the logic units in the T-drivers, this also generally describes how a T-driver places its two associated individual bus systems into the "dominant" status when a logic 1 level is set at its fifth input (signal "Text").

As a result of the first activation of a T-driver other than T-driver (2) [for example, of the just described first activation of T-driver (1) by the CAN controller (7) signal "Tx"], a logic 1 level is present, as explained, at the fifth input (27) of T-driver (2) (signal "Text"). In this case, the logic unit contained in T-driver (2) causes the individual bus system 3 and the individual bus system 4, which are connected to T-driver (2), to switch to the "dominant" status. Since T-drivers (1, 2, 3) have the same design and since the two aforementioned differences in the circuitry between T-drivers (2, 3) and T-driver (1) are unimportant with respect to the function of the signal "Text", the process of how a logic 1 level at the fifth input (27) of T-driver (2) (signal "Text") can place the individual bus systems 3 and 4 in the "dominant" status is described using the T-driver (1) and logic unit (85) circuit as shown in FIG. 3.

When a logic 1 level is present at the fifth input (25) (signal "Text") of T-driver (1) in FIG. 1, this level is also present at the first input (25) of logic unit (85) of FIG. 3. As a result, the third and fourth OR-elements (88, 89) generate a logic 1 level at the third and fourth outputs (55, 57) (signals "C", "E"). Signals "C" and "E" place the individual bus systems 1 and 2 associated with T-driver (1) into the "dominant" status, as already explained.

The foregoing has explained how two different results can occur following a first activation of T-driver (1) by means of the signal "Tx" from CAN controller (7) of FIG. 1. The first result is that the individual bus systems 1 and 2 associated with T- driver (1) are placed in the "dominant" status. The second result is that, through the effect of the sixth outputs (26, 28, 30) (signal "Rint"), and the logic 1 levels generated by OR-elements (4, 5, 6) at the fifth inputs (25, 27, 29) (signal "Text") of T-drivers (1, 2, 3) in FIG. 1, all individual bus systems which are still "recessive", and which are connected to the additional T-drivers in the star coupler, also convert to the "dominant" status.

Furthermore, it can be seen that, due to the completely analogous structure of the T-drivers with respect to the fifth input (signal "Text") and the sixth output (signal "Rint"), all individual bus systems connected to T-drivers (1, 2, 3) are placed in the "dominant" status either during a first activation by CAN control signal "Tx", or whenever a logic 1 signal (signal "Rint") is sent to the sixth output of any one of T-drivers (1, 2, 3).

In summation, it can therefore be stated that all individual bus systems of the star coupler always become "dominant" when any reason for the "dominant" status exists. On the one hand, such a reason exists when any arbitrary bus party on any arbitrary individual bus system brings this individual bus system into the "dominant" status and, on the other hand, whenever CAN controller (7) feeds a logic 1 level to the seventh input (8) (signal "Tx") of T-driver (1) of FIG. 1.

A CAN controller also performs reading functions in addition to its control functions. For this purpose, CAN controller (7) constantly monitors the status of all individual bus systems of the star coupler. It is informed of the status of the individual bus systems with the aid of the eighth output (9) of T-driver (1) (signal "Rx") of FIG. 1. In the process, T-driver (1) generates a logic 1 level at its eighth output (9) (signal "Rx") if the status "dominant" prevails on any one of the individual bus systems connected to the star coupler.

Reference is made in this regard to logic unit (85) for T-driver (1) as shown in FIG. 3. With the aid of its four inputs (94, 95, 96, 97), the second OR-element (87) generates the signal "Rx" at the output (98), wherein the output (98) simultaneously represents the eighth output (9) of T-driver (1) to CAN controller (7) of FIG. 1.

Corresponding to the four inputs (94, 95, 96, 97) of second OR-element (87), the output (9) (signal "Rx") to CAN controller (7) is set to logic 1 under any one of the following four conditions.

The first condition represents the situation in which the first activation is performed by CAN controller (7), by providing a logic 1 level at the seventh input (8) of T-driver (1) of FIG. 1 (signal "Tx"). In accordance with the above described circuitry, a logic 1 level will also be present at the first input (94) of second OR-element (87). As specified in the CAN standard, CAN controller (7) will read back a "dominant" status, initiated by itself, via the signal "Rx".

The second condition occurs when a logic 1 level is present at the fifth input (25) of T-driver (1) of FIG. 1 (signal "Text") . As a result, a logic 1 level will also be present at the second input (95) of second OR-element (87). As explained above, this means that the status "dominant" is provided on at least one other T-driver than on T-driver (1) [namely, at least one of the T- drivers (2, 3)].

The third condition occurs when a logic 1 signal is provided via the third input (56) (signal "D") of logic unit (85), and thus also the third input (96) of third OR-element (87). As previously explained, this means that the individual bus system 1 associated with T-driver (1) is in the "dominant" state.

Analogously to the third condition above, the fourth condition occurs when a logic 1 signal is present on the fourth input (58) (signal "E") of logic unit (85), and thus also on the fourth input (97) of third OR-element (87). Therefore, the fourth condition means that the "dominant" status is present on the individual bus system 2 associated with T-driver (1).

As indicated above, any of these four conditions indicate that a logic 1 signal "Rx" is supplied to CAN controller (7) of FIG. 1 in all cases in which the "dominant" state is present on any arbitrary individual bus system. That is, either the CAN controller itself, as the first activator, forces the dominance on the individual bus systems by means of its signal "Tx", or, alternately, any arbitrary bus party assumes the role of first activator on any arbitrary single bus system by placing that particular individual bus system in the "dominant" status.

In regard to causes, "external", in relation to a T- driver, where the individual bus systems associated with the T-driver are placed in the "dominant" state, is effected when a logic 1 level is applied to the T-driver's fifth or seventh input (25, 8) (signals "Text", "Tx") in accordance with FIG. 2. The term "external" is used herein as the opposite of the term "internal", and indicates that the causes for placement in the "dominant" status lie outside of the sphere of influence of this T-driver; i.e., that they are not determined by the actions of the two individual bus systems associated with this T-driver.

With respect to a T-driver, "internal" reasons for placement of its associated individual bus systems in the "dominant" status occur if one of these individual bus systems is in the "dominant" status (caused by another bus party as the first activator in this individual bus system). In accordance with FIG. 3, a logic 1 signal is then present at the third or the fourth inputs (56, 58) (signal "D", signal "F") of logic unit (85), depending on which one of the two individual bus systems is in the "dominant" status. The third and fourth OR-elements (88, 89) cause the bus system which is not yet "dominant", but still "recessive", to convert to the "dominant" state. A logic 1 signal at the third input (56) (signal "D") of logic unit (85) generates a logic 1 level at the fourth output (57) (signal "E") of logic unit (85) via the described linkage of the OR-elements. In the same way a logic 1 signal at the fourth input (58) (signal "F") of logic unit (85) generates a logic 1 level at the third output (55) (signal "C") of logic unit (85). As already described in accordance with FIG. 2, a logic 1 signal "C" places the individual bus system 1 in the "dominant" state and a logic 1 signal "E" places the individual bus system 2 in the "dominant" state.

When "external" as well as "internal" causes are present for placement of the individual bus systems associated with T-drivers (1, 2, 3) in the "dominant" state, the T-drivers (1, 2, 3) report this fact to the other T-drivers via their sixth outputs (26, 28, 30) (signals "Rint", see FIG. 1). However, in the case of external causes, this report need only be made if CAN controller (7) has been the first activator, via its signal "Tx". In the case of an external cause occurring because a bus party of an individual bus system associated with another T-driver is the first activator, a report can be omitted. OR-elements (4, 5, 6) of FIG. 1 are provided for this case. They assure that signals "Text" are generated for all T-drivers (1, 2, 3) [logic 1 level at the fifth inputs (25, 27, 29)] if only one of T-drivers (1, 2, or 3) generates a logic 1 level at its sixth output (26, 28, or 30) (signal "Rint").

Thus, a T-driver (1, 2, or 3) of FIG. 1 generates a logic 1 level at its sixth output (26, 28, or 30) (signal "Rint") under the described "external" and under all "internal" conditions for setting the "dominant" state. Circuit-wise, the signal "Rint" is generated by first OR-element (86) of logic unit (85) in FIG. 3. It can be seen from the described circuitry of first OR-element (86), that the first output (26) (signal "Rint") of logic unit (85) is set to logic 1, based on the level status at the three inputs (90, 91, 92) of first OR-element (86), under one of the following conditions:

a logic 1 level at the second input (8) (signal "Tx") of logic unit (85) ["external" cause because of the action of CAN controller signal "Tx"];

a logic 1 level at the third input (56) (signal "D") of logic unit (85) [first "internal" cause];

a logic 1 level at the fourth input (58) (signal "F") of logic unit (85) [second "internal" cause].

In accordance with FIG. 1, OR-elements (4, 5, 6) then transmit in the described manner the signals from the sixth outputs (26, 28, 30) (signals "Rint") of T-drivers (1, 2, 3) to the fifth inputs (25, 27, 29) (signals "Text") of T-drivers (1, 2, 3).

An electronic component "logic 1 delay" will be described below, which will then be used in the description to follow.

Figure 6A:
FIG. 6a shows the symbol of the componentry "logic 1 delay".

FIG. 6a represents the symbol of the electronic componentry (107), which has an input (108) and an output (109). It is intended to insert this componentry between a logic output of a logic electronic circuit element and a logic input of another logic circuit element. As a result, a logic 1 signal at the input (108) appears delayed by time Tv1 at the output (109) of the componentry, while a logic 0 signal at the input (108) of componentry (107) appears at the output (109) with a comparatively slight delay Tv0; i.e., Tv0<<Tv1.

Figure 6B:
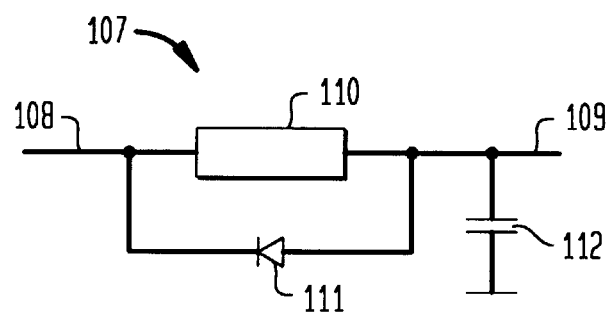
FIG. 6b shows the structure of the componentry "logic 1 delay".

FIG. 6b represents the schematic of componentry (107). A parallel circuit, consisting of a resistor (110) and a diode (111) of the polarity shown in FIG. 6b is located between the input (108) and the output (109). One side of a capacitor (112) is connected to the output (109). The other side of capacitor (112) is connected to ground potential. The voltage waveforms at the input and output (108, 109) of componentry (107) are represented in FIG. 6c to explain the operation of componentry (107).

Figure 6C:
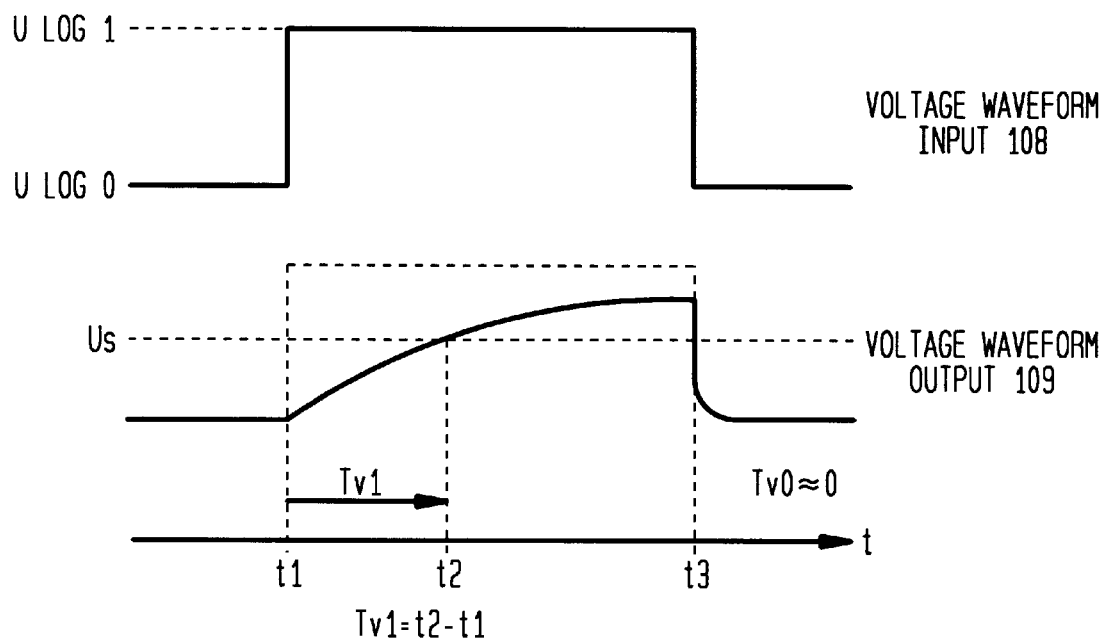
FIG. 6c is a time diagram of the componentry "logic 1 delay".

As can be seen in FIG. 6c, the level at the input (108) of componentry (107) changes from the logic 0 level to the logic 1 level at the time t1. The output (109) of the componentry (107) is not capable of following the level jump immediately at time t1, since diode (111) is connected in the blocking direction. Instead, capacitor (112) is charged, starting at the logic 0 level, with a time constant determined by resistor (110) and capacitor (112).

At time t2, the output (109) of componentry (107) exceeds the switching threshold Us of a logic input, not shown, which is connected to the output (109) of componentry (107). The elapsed time between times t1 and t2 is the desired delay time Tv1 for the logic 1 level (Tv1=t2–t1). Desired delay time Tv1 is set by means of a suitable value of capacitor (112), resistor (110), and the conducting and blocking characteristics of diode (111).

The level at the input (108) of the componentry (107) changes from the logic 1 state to the logic 0 state at time t3. At that time, diode (111) operates in the conducting direction. Capacitor (112) is rapidly discharged because of the comparatively low conducting resistance of diode (112), so that the logic output (109) drops rapidly below the switching threshold Us. With the proper selection of component parameters, delay time Tv0 of the logic 0 level is very small in comparison with Tv1, and can therefore be neglected.

In a typical application, delay time Tv1 ranges between 100 and 200 ns, using componentry (107).

In the previous discussion, it was assumed that feedback suppression device 1 (53) in FIG. 2 was configured with the inputs and outputs (59, 61) and (62, 60) continuously connected. The inputs and outputs (63, 65) and (66, 64) of feedback suppression device 2 (54) are continuously connected in the same way. However, undesirable feedback will occur in an embodiment based on these assumptions. This feedback occurs as a result of bus activities which are initiated by CAN controller (7) (see FIG. 1), as well as with bus activities which originate from any arbitrary bus party on any arbitrary individual bus system (see FIG. 1). Reference is made to FIG. 2 for the following explanations of this feedback effect.

If, for example, a bus party connected to individual bus system 1 impresses the status "dominant" on individual bus system 1, a logic 1 signal appears at the third input (56) (signal "D") of logic unit (85). As previously described, the logic 1 status at the third input (56) causes a logic 1 signal to be present at the first output (26) of logic unit (85) (signal "Rint") as shown in FIG. 3. As described, this signal generates a logic 1 level at the first input (25) (signal "Text") of logic unit (85) of FIG. 3 via the other T-drivers (2, 3) and OR-elements (4, 5, 6) of FIG. 1. As previously explained, a logic 1 signal is therefore generated via the third output (55) (signal "C") of logic unit (85) to the individual bus system 1 via feedback suppression device 1 (53) (see FIG. 2). This causes the individual bus system 1 to be maintained in the "dominant" status, even when the aforementioned bus party on the individual bus system 1 had released the individual bus system 1, which would have otherwise caused the individual bus system 1 to change to the "recessive" status.

A feedback effect of this type also occurs if the bus activities are initiated by CAN controller (7) [signal "Tx" at the second input (8) of logic unit (85)] as shown in FIGS. 1 and 3. In this case, a logic 1 signal is issued at the first output (26) (signal "Rint") of logic unit (85) as shown in FIG. 3. A logic 1 level is also generated at the first input (25) (signal "Text") of logic unit (85) as previously described (FIG. 1). If CAN controller (7) (see FIG. 1) now returns its signal "Tx" to logic 0 [second input (8) of logic unit (85) in FIG. 3], the input signal "Text" [first input (25) of logic unit (85)] remains in the logic 1 state, due to the signal passage times through the aforementioned circuit path. For this reason, the connected individual bus systems remain set in the "dominant" state, even though CAN controller (7) (see FIG. 1) has returned the signal "Tx" to logic 0.

Figure 4A:
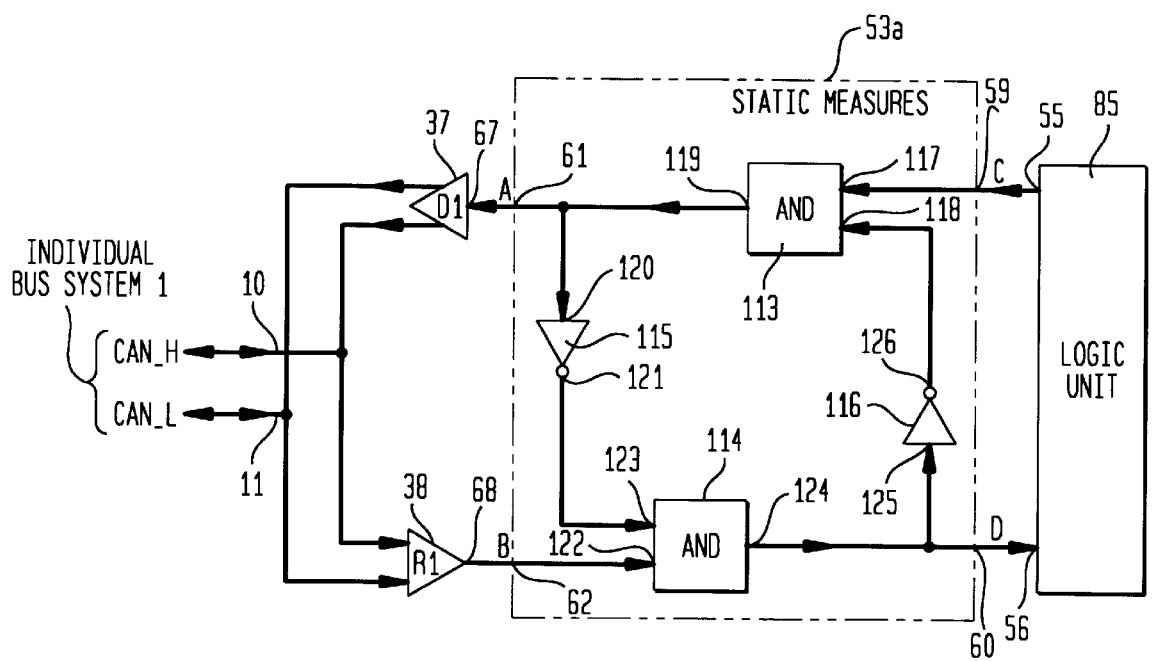
FIG. 4a shows the static measures for feedback suppression in a T-driver.

FIG. 4a shows a variant of feedback suppression device 1 (53a), wherein the feedback suppression device 1 (53) of FIG. 2 has been provided with static suppression means. This circuit consists of a first AND-element (113), a second AND-element (114), a first inverter (115) and a second inverter (116). The first AND-element (113) has a first input (117), a second input (118) and an output (119). The second AND-element (114) has a first input (122), a second input (123) and an output (124). The first inverter (115) has an input (120) and an output (121). The second inverter (116) has an input (125) and an output (126). The first input (59) (signal "C") of feedback suppression device 1 (53a) is connected to the first input (117) of first AND- element (113). The output (119) of first AND-element (113) is connected to the second output (61) (signal "A") of feedback suppression device 1 (53a), as well as to the input (120) of first inverter (115). The output (121) of first inverter (115) is connected to the second input (123) of second AND-element (114). The second input (62) (signal "B") of feedback suppression device 1 (53a) is connected to the first input (122) of second AND-element (114). The output (124) of second AND- element (114) is connected to the first output (60) (signal "D") of feedback suppression device 1 (53a), as well as to the input (125) of second inverter (116). The output (126) of second inverter (116) is connected to the second input (118) of first AND-element (113).

The logic circuit elements connected in this manner constitute an R-S flipflop with two stable states and an open state. Hereinafter the open state will be called the "ready" state, the first stable state will be called "internal", and the second stable state "external". The control of the R-S flipflop is derived from the first and second inputs (59, 62) of feedback suppression device 1 (53a).

Figure 4B:
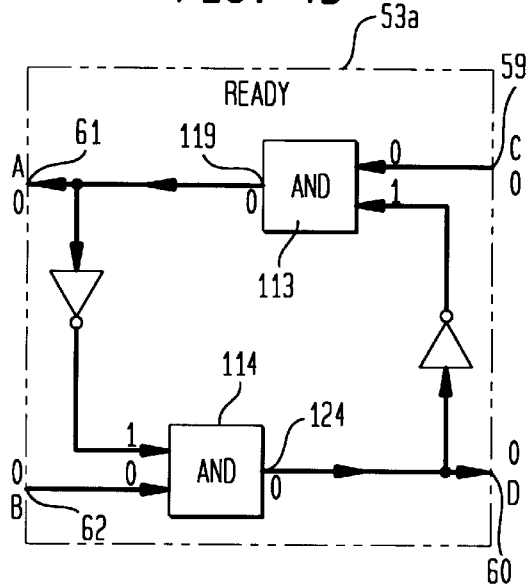
Figure 4C:
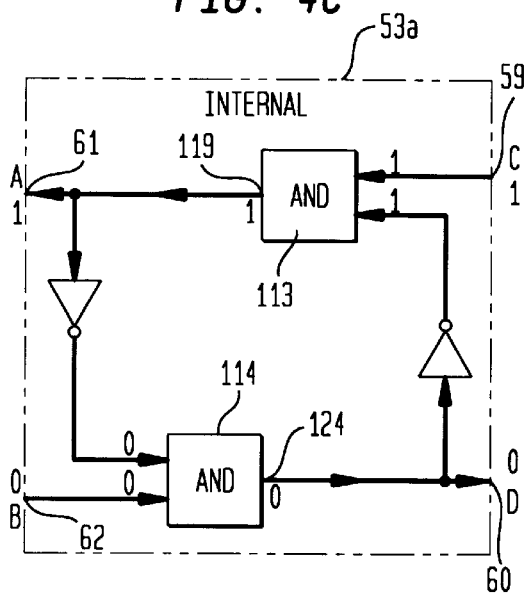
Figure 4D:
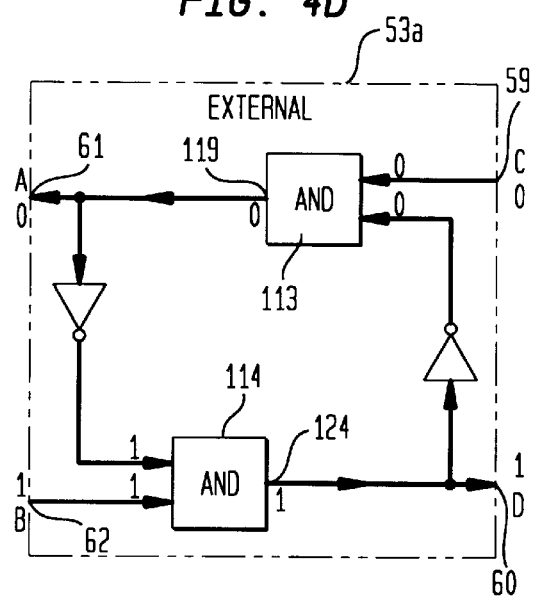

Feedback suppression device 1 (53a) of FIG. 4a is shown in somewhat simplified form for the "ready", "internal" and "external" states in FIGS. 4b, 4c and 4d, respectively. In these representations, the logic states of the first and second inputs (59, 62) controlling the flipflop function, as well as the logic states of the first and second outputs (60, 61) are also shown (logic 0 as the numeral 0, logic 1 as the numeral 1). In regard to the following detailed explanations, reference is made to FIG. 4a in the explanations of FIGS. 4b to 4d, since all reference numerals are included in FIG. 4a, while some reference numerals have been omitted in FIGS. 4b to 4d for the sake of clarity.

FIG. 4b shows feedback suppression device 1 (53a) in the "ready" state. This state always prevails when both input signals (59, 62) of feedback suppression device 1 (53a) are set to logic 0. This means that there is neither a request (signal "Tx") from CAN controller (7) of FIG. 1 to place the connected individual bus systems into the "dominant" status, nor is there a report from the individual bus system 1 via the bus receiver (38) in FIG. 2 that the individual bus system 1 is in the "dominant" status. The logic 0 levels at the first inputs (117, 122) in FIG. 4a of the first and second AND-elements (119, 124) cause the outputs of both AND-elements (119, 124) to be set to logic 0. This logic 0 signal is converted into a logic 1 signal by means of the first and second inverters (115, 116), so that a logic 1 level is present at the second inputs (118, 123) of first and second AND-elements (113, 114). As a result, first and second AND-elements (113, 114) are "ready" for switching to another state. A switch takes place when a logic 1 signal appears at one of the respective first inputs (117, 122) of the two AND-elements (113, 114).

As long as the "ready" state exists, the first and second outputs (60, 61) of feedback suppression system 1 (53a) of FIG. 4a are also in the logic 0 state, corresponding to the outputs of both AND-elements (113, 114). Thus, the "ready"

state is switched if a logic 1 signal is supplied either to the first input (59) or the second input (62) of feedback suppression device 1 (53a).

FIG. 4c shows feedback suppression device 1 (53a) in the "internal" state. This state is taken if a logic 1 signal (signal "C") is supplied to the first input (59) of feedback suppression device 1 (53a). The output (119) of first AND- element (113) switches to the logic 1 state, and this signal is inverted in inverter (115), so that a logic 0 signal is present at the second input (123) of second AND- element (114). Thus, second AND-element (114) remains blocked. A logic 0 level is present at its output (124), which continues to maintain the second input (118) of first AND-element (113) in the logic 1 state via second inverter (116). Based on logic unit (85) of FIG. 2, the individual bus system 1 is placed in the "dominant" status via the bus driver (37) in this way.

The bus receiver (38) in FIG. 2 now supplies a logic 1 signal to the second input (62) of feedback suppression device 1 (53a) of FIG. 4c, since it has detected the "dominant" status of the individual bus system 1. Second AND-element (114) of feedback suppression device 1 (53a), however, blocks the further transmission of this signal, so that the first output (60) of feedback suppression device 1 (53a) remains in the logic 0 state. As long as logic unit (85) keeps the signal "C" in the logic 1 state, the path from "inside" to "outside" remains passable [i. e., from logic unit (85) to the individual bus system 1, which means that bus driver (37) in FIG. 2 is triggered because of an internal request]. At the same time, the path from "outside" to "inside" remains blocked [i.e., from the individual bus system 1 to logic unit (85)].

When logic unit (85) returns the signal "C" to logic 0, feedback suppression device 1 (53a) again takes up the "ready" state in accordance with FIG. 4b.

FIG. 4d shows feedback suppression device 1 (53a) in the "external" state. Starting from the "ready" state in accordance with FIG. 4b, the "external" state is taken if a bus party on the individual system 1 has placed this bus into the "dominant" status. In that case, a logic 1 signal appears at the second input (62) (signal "B") of feedback suppression device 1 (53a), which sets the output (124) of second AND-element (114) to logic 1. The second input (118) of first AND-element (113) is set to logic 0. The output (119) of first AND-element (113) also changes into the logic 0 state and, because of the inversion in first inverter (115), a logic 1 signal is present at the second input (123) of second AND-element (114). This causes AND-element (114) to remain open, i.e., to output a logic signal. As a result, the path from "outside" to "inside" is opened [from the individual bus system 1 to logic unit (85)], while all internal requests which now might arrive (requests from "inside" to "outside") are blocked. As long as the bus receiver (38) keeps the second input (62) of feedback suppression device 1 (53a) of FIG. 4a at logic 1, only information from the individual bus system 1 is transmitted to logic unit (85) of FIG. 2. From the "external" state, the "ready" state is again assumed when the level at the second input (62) of feedback suppression device 1 (53a) returns to logic 0.

Thus, feedback suppression device 1 (53a) of FIG. 4a represents a locking unit which prevents the simultaneous transmission from "inside" to "outside" and "outside" to "inside". It assures that only one transmission direction is available at a given time.

However, brief overlaps of signals may occur with the static design of feedback suppression device 1 (53a) of FIG. 4a, in the course of changing from one state to another.

Let it be assumed that the "internal" state in accordance with FIG. 4c has been established. Therefore, the individual bus system 1 is in the "dominant" status and a transmission from "inside" to "outside" takes place. At the end of the transmission, feedback suppression device 1 (53a) again returns to the "ready" state, i.e., the second input (123) of second AND- element (114) is set to logic 1. Starting from this time, logic 1 signals from the output (68) of bus receiver (38) are again permitted.

During the previous (and now just ended) transmission of the "internal" status in accordance with FIG. 4c, the individual bus system 1 was in the "dominant" state, and therefore a logic 1 signal (signal "B") provided from the output (68) of the bus receiver (38) in FIG. 2 was present at the second input (62) of feedback suppression device 1 (53a) during this time. While feedback suppression device 1 (53a) was still in the "internal" state, this signal was assuredly blocked.

With the change from the "internal" state to the "ready" state, second AND-element (114) is triggered to open at practically the same time by means of the logic 1 signal at its second input (123). However, at this time the logic 1 signal present at the first input (122) of AND-element (114), from the output (68) of bus receiver (38), has not yet died out. Therefore, during a short period of time, a logic 1 level is present at both inputs (122, 123) of second AND-element (114), causing an interference logic 1 signal to be present at its output (124). During the transition between the "internal" state and the "ready" state of feedback suppression device 1 (53a), this interference signal prevents the assured separation of the transmission directions and therefore must be suppressed.

Suppression of this interference signal is achieved in that the logic 1 signal at the output (121) of first inverter (115) is supplied to the second input (123) of second AND-element (114) delayed by a time T1. The time T1 is determined from the signal travel times in the individual bus system 1 and must be selected to be long enough so that it exceeds the time necessary for the signals from the previous "internal" operation to die out.

Figure 5:
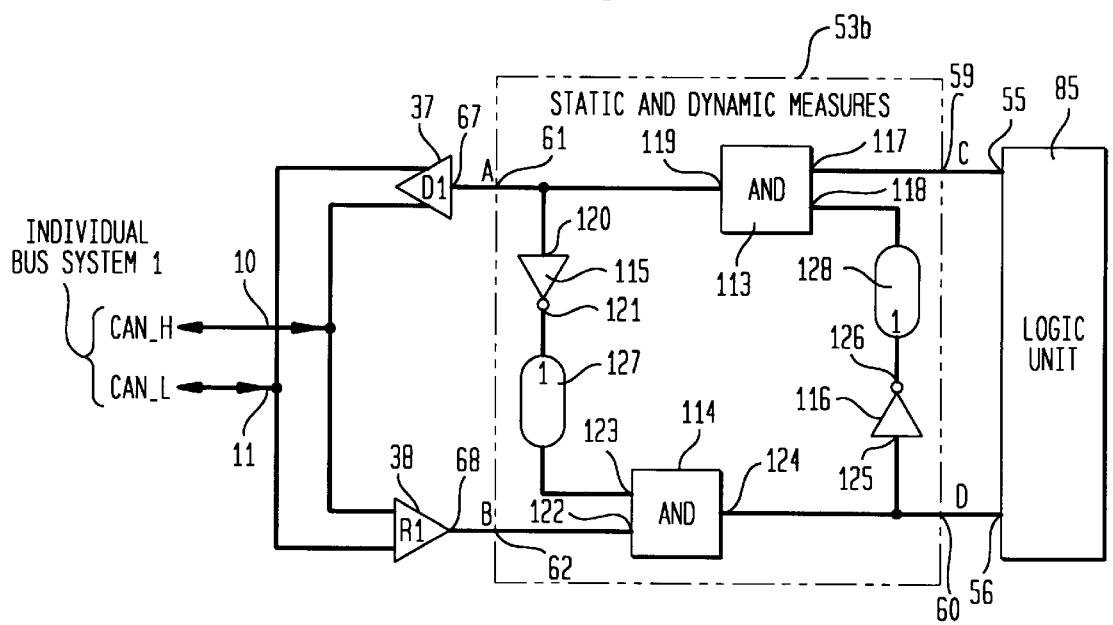
FIG. 5 represents static and dynamic measures for a feedback suppression device in a T-driver.

FIG. 5 shows an embodiment of a circuit for inserting this time delay. An electronic componentry (127) of the "logic 1 delay" type is interposed between the output (121) of first inverter (115) and the second input (123) of second AND-element (114). The type and design of this componentry (127) has already been explained in conjunction with FIGS. 6a to 6c.

Brief overlaps of signals may also occur in the course of the change from "external" to "ready", as in the course of the change of feedback suppression device 1 (53a) from "internal" to "ready". In the same way, the second input (118) of first AND-element (113) in FIG. 4b is set to logic 1 at practically the same time of the assumption of the "ready" state from the "external" state, without the logic 1 level at the first input (117) of first AND-element (113) [as explained, this signal corresponds to the signal "C" of logic device (85)] having already changed. Again, it is necessary to prevent the creation of an interference signal at the output (119) of first AND-element (113). In accordance with FIG. 5, a logic delay circuit (127) is inserted between the output (126) of second inverter (116) and the second input (118) of first AND-element (113). This delay circuit prevents a logic 1 signal from appearing at the second input (117) of first AND-element (113) for a time T2 before the signal "C" [third output of logic unit (85) of FIG. 3] has died out.

FIG. 5 shows the final feedback suppression device 1 (53b), in which static measures in accordance with FIG. 4a, as well as the last described dynamic measures for suppressing the interference signals, are contained. During actual tests, it has been shown that the delay time T1 of delay circuit (127) should be set to a value in the range between 100 ns and 200 ns, while the delay time T2 of delay circuit (128) should be set to a value in the range between 50 ns and 100 ns. Since the delay circuits are used for compensating passage time delays, the delay times which should be set are a function thereof, and therefore, of the circuit technology implemented.

In summary, it can be stated that, with the use of the described devices, a CAN controller (7) of FIG. 1 operates a star coupler consisting of an arbitrary number of individual bus systems in the same manner as if it were to operate only a single CAN bus in a CAN standard application. A transfer of a logic status of the data line of an individual bus system to all other connected individual bus systems takes place. The arbitration is extended to all connected individual bus systems while maintaining the arbitration mechanism.

In addition to the embodiments described herein, numerous other embodiments may be devised by those having ordinary skill in the art without departing from the spirit and scope of the following claims.

The claimed invention is:

1. A serial bus system operating in accordance with a carrier sense multiple access method with bitwise arbitration, comprising
   at least two individual bus systems, each of said individual bus systems including
      a single bidirectional bus line for disposing of one of a dominant status bit or recessive status bit, and
      a bus driver for selecting said one of a dominant or recessive status bit based on a received voltage level, such that each of said individual bus systems being dominant when said received voltage level being in a predetermined range, and otherwise being recessive,
   wherein said serial bus system being dominant when at least one bus driver outputs a dominant status bit, otherwise said serial bus system being recessive,
      a star coupler connected to said individual bus systems, generating a combined bus system,
      said star coupler comprising additional driver circuits and logic circuits such that all of said individual bus systems communicate with said star coupler and are controlled by said star coupler independently of each other.

2. The serial bus system of claim 1, wherein said logic circuits transmit a logic state of any of said individual bus systems to all other said individual bus systems, where the arbitration mechanism is maintained.

3. The serial bus system of claim 2, wherein said logic circuits suppress feedback of the dominant status of said individual bus systems.

4. The serial bus system of claim 3, wherein said feedback suppression logic circuits comprise static and dynamic components.

5. The serial bus system of claim 4, wherein said feedback suppression logic circuits assure that only one transmission direction at one time is permitted.

6. The serial bus system of claim 1, wherein one of said individual bus systems comprises an interface with a bus controller.

7. The serial bus system of claim 1, wherein said star coupler contains at least one T-driver, each said T-driver operating two of said individual bus systems.

8. The serial bus system of claim 1, wherein said logic circuits switch off one of said individual bus systems without affecting data traffic between the other said individual bus systems.

9. The serial bus system of claim 8, wherein said logic circuits further switch off a transmitting unit of said star coupler associated with said individual bus system to be switched off, and said logic circuits also block a receiving unit of said star coupler associated with said individual bus system to be switched off.

10. The serial bus system of claim 1, further comprising an error detection device for detecting a sustained error in said individual bus systems.

11. The serial bus system of claim 10, wherein said device for detecting said sustained error senses a physical level outside of a permissible range.

12. The serial bus system of claim 11, wherein said device for detecting said sustained error detects the lack of expected data.

13. The serial bus system of claim 10, wherein said logic circuits switch off any of said individual bus systems as a result of detecting said sustained error.

14. A serial bus system comprising
   a plurality of individual bus systems connected to at least one T-driver, each of said individual bus systems including
      a single bidirectional bus line for disposing of one of a dominant status bit or recessive status bit, and
      a bus driver for selecting said one of a dominant or recessive status bit based on a received voltage level, such that each of said individual bus systems being dominant when said received voltage level being in a predetermined range, and otherwise being recessive,
   wherein said serial bus system being dominant when at least one bus driver outputs a dominant status bit, otherwise said serial bus system being recessive,
      at least one logic circuit corresponding to an interconnected with each of said T-drivers,
      a bus controller connected to one of said T-drivers, and
   wherein said T-drivers, said logic circuits, and said bus controller enable communication with, and independent control of, each of said individual bus systems.

15. A method of communicating between a plurality of individual serial bus systems, comprising the steps of
   receiving a control signal from a bus controller,
   processing said control signal through at least one T-driver and associated logic circuits for the purpose of communicating with said plurality of individual serial bus systems, each of said individual bus systems comprises the steps of
      disposing of one of a dominant status bit or recessive status bit on a single respective bidirectional bus line, and
      selecting said one of a dominant or recessive status bit based on a received voltage level, such that each of said individual bus systems being dominant when said received voltage level being in a predetermined range, and otherwise being recessive,
   wherein said serial bus system being dominant when at least one bus driver outputs a dominant status bit, otherwise said serial bus system being recessive,
      using feedback suppression circuits to assure that data flows in only one direction at a time,
      sensing a sustained error in said individual bus systems, and
      when a sustained error is detected in any one of said individual bus systems, switching off said individual bus system exhibiting said sustained error, without affecting said data flow between any of the other said individual bus systems.

* * * * *